United States Patent [19]

Schlumbom et al.

[11] 3,721,654

[45] March 20, 1973

[54] PROCESS FOR PREPARING COPOLYMERS OF MALEIC ANHYDRIDE AND 2-ALKOXYPROPENE

[75] Inventors: Peter Schlumbom, Irvington; David A. Gordon, Scarsdale, both of N.Y.

[73] Assignee: Ciba-Geigy Corporation, Greenburgh, N.Y.

[22] Filed: Nov. 2, 1970

[21] Appl. No.: 86,371

Related U.S. Application Data

[63] Continuation-in-part of Ser. No. 888,832, Dec. 29, 1969, Pat. No. 3,635,916.

[52] U.S. Cl..................260/78.5 R, 424/47, 424/70, 260/30.4 R, 252/8.57
[51] Int. Cl..............................................C08f 17/00
[58] Field of Search.....................260/78.4 R, 78.5

[56] References Cited

UNITED STATES PATENTS

| | | | |
|---|---|---|---|
| 3,436,378 | 4/1969 | Azorlosa et al | 260/78.5 |
| 3,468,857 | 9/1969 | Graver | 260/80.3 |

*Primary Examiner*—James A. Seidleck
*Assistant Examiner*—John Kight, III
*Attorney*—Karl F. Jorda and Nestor W. Shust

[57] ABSTRACT

A process for the preparation of maleic anhydride/2-alkoxypropene copolymers which comprises polymerizing maleic anhydride and 2-alkoxypropene in an organic solvent in the presence of a radical catalyst. The resulting copolymers have an intrinsic viscosity of from about 0.1 to about 0.5 at 30°C in tetrahydrofuran. When esterified, the copolymers are useful in treating leather and in hairspray compositions.

5 Claims, No Drawings

PROCESS FOR PREPARING COPOLYMERS OF MALEIC ANHYDRIDE AND 2-ALKOXY-PROPENE

DETAILED DISCLOSURE

This application is a continuation-in-part of the copending application Ser. No. 888,832, filed Dec. 29, 1969, for Copolymers of Halfesters of Maleic Anhydride and 2-Alkoxypropene now U.S. Pat. No. 3,635,916.

This invention relates to a process for the preparation of maleic anhydried/2-alkoxypropene copolymers which have intrinsic viscosities of from about 0.1 to 0.5 at 30° in tetrahydrofuran. The copolymers of this invention can be represented by a repeating unit of the formula

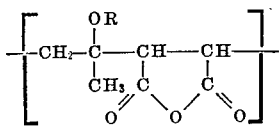

wherein R is an alkyl group having from one to four carbon atoms.

The above described copolymers can be esterified with either an ether alcohol or a mixture of an ether alcohol and an alkyl alcohol to give halfester resins which are useful as main components in leather treating systems or in hairsprays. The esterification reaction is carried out at a temperature of from about 50° to about 150° either in the presence or absence of both an inert solvent and an acid catalyst. This reaction is described in greater detail in the above mentioned parent application.

The copolymers that are represented by the above formula have been prepared previously as, for example, in a copending application of Okamura et al., Ser. No. 842,368, filed July 16, 1969 now U.S. Pat. No. 3,642,723. Previously employed methods, however, yield copolymers of lower molecular weight which have an intrinsic viscosity of 0.1 or less at 30° in tetrahydrofuran. The process of this invention yields higher molecular weight copolymers which have an intrinsic viscosity between 0.1 and 0.5.

The instantly claimed copolymerization process is carried out in the presence of a radical initiator, preferably in an organic solvent and at a temperature of between 0° and 120°C, preferably between 30° and 80°C. The ratio of maleic anhydride to 2-alkoxypropene can vary from 1:5 to 5:1 and preferably 1:0.5 to 1:2. Whenever the reaction mixture contains an excess of maleic anhydride the resulting copolymer will be generally of the lower molecular weight with intrinsic viscosities below 0.25. For higher molecular weight copolymers either an equimolar amounts of the comonomers or an excess of 2-alkoxypropene should be employed and the solvent preferably should be dioxane.

The radical initiators that can be used as catalysts are organic peroxides or azo catalysts such as $\alpha,\alpha'$-azo-bis-isobutyronitrile. Suitable organic peroxides include alkylhydroperoxides, for example, tert-butyl hydroperoxide, pinane hydroperoxide, cumene hydroperoxide, diisopropylbenzene hydroperoxide, p-methane hydroperoxide and para-tert-butylcumene hydroperoxide, di-tert-butyl peroxide, peroxide derivatives of aldehydes and ketones such as hydroxyheptaldehyde, methylethyl ketone peroxide, methylisobutyl ketone peroxide and cyclohexanone peroxide.

Peroxy esters such as tertiary butyl peracetate, tertiary butyl perbenzoate, ditertiary butyl diisopropyl peroxydicarbonate and tertiary butyl permaleic acid are also useful.

Based on the weight of the maleic anhydride monomer present, the amount of the radical initiator may be as low as 0.01 percent or as high as about 40 percent. Efficient polymerization is obtained by using from about 0.05 to about 2 percent.

The copolymerization is carried out in an inert atmosphere such as nitrogen, helium, argon and the like. Nitrogen is preferred primarily for economical reasons.

Although the process of this invention can be carried out without the addition of a solvent, it is generally preferable to employ a solvent in which maleic anhydride is soluble and which does not interfere with the copolymerization reaction. Illustrative examples of useful solvents are aromatic hydrocarbons such as benzene, toluene, ethylbenzene, xylene, p-cymene and cumene; ketones such as methyl amyl ketone, methylisobutyl ketone, methyl ethyl ketone, acetone and the like; acetates such as butyl acetate and amyl acetate; and ethers of ethylene glycol such as ethylene glycol monobutyl ether and ethylene glycol monoethyl ether and cyclic ethers such as dioxane or acetone dimethyl ketal. When the last mentioned compound is used it acts both as a solvent and as a source of 2-methoxypropene.

To illustrate further the nature of this invention, there are presented below the following examples. These examples are only for the purpose of illustration and are not intended to limit this invention in any way.

EXAMPLE 1

In a reaction tube were placed
1.48 parts of maleic anhydride,
1.08 parts of 2-methoxypropene
12.5 parts of acetone dimethyl ketal and
0.06 part of $\alpha,\alpha'$-azo-bis-isobutyronitrile and dissolved to a clear solution. The glass tube was flushed with nitrogen, sealed and heated for 24 hours at 60°C. The polymer formed was separated by suction, washed with acetone dimethyl ketal and dried. 2.47 Parts of maleic anhydride/2-methoxypropene copolymer was obtained as a white powder. The intrinsic viscosity of the copolymer at 30°C in tetrahydrofuran was 0.24.

EXAMPLE 2

When in Example 1 the quantities of 2-methoxypropene and acetone dimethyl ketal were 0.54 and 13.3 parts respectively 2.1 parts of the copolymer were obtained. The intrinsic viscosity was 0.16.

EXAMPLE 3

When in Example 1 acetone dimethyl ketal was replaced by 7.9 parts of 1,4-dioxane, 2.57 parts of the copolymer were obtained. The intrinsic viscosity was 0.3.

EXAMPLE 4

Following the general procedure of Example 1, 1.48 parts of maleic anhydride, 1.08 parts of 2-methoxypropene, 6 parts of dioxane and 0.06 parts of α,α'-azo-bissobutyronitrile were employed. The copolymerization was carried out at 40°C yielding 1.75 parts of the copolymers (67 percent yield) having the intrinsic viscosity of 0.45.

EXAMPLE 5

Example 4 was repeated except that 8 parts of dioxane and 0.17 parts of lauryl peroxide were employed. An 86 percent yield of the copolymer was obtained having the intrinsic viscosity of 0.28.

EXAMPLE 6

Example 4 was repeated except that 6 parts of acetone dimethyl ketal and 0.144 parts of 2,4-dichlorobenzoyl peroxide were employed. A 91 percent yield of the copolymer was obtained. It had the intrinsic viscosity of 0.26.

EXAMPLE 7

Following the procedure of Example 1, 1.48 parts of maleic anhydride, 2.16 parts of 2-methyoxypropene, 8.5 parts of toluene and 0.06 parts of α,α'-azo-bis-isobutyronitrile were copolymerized at 60°C. The copolymer was obtained in an 83 percent yield having the intrinsic viscosity of 0.25.

What is claimed is:

1. A process for the preparation of a copolymer of maleic anhydride and 2-alkoxypropene having an intrinsic viscosity of between 0.1 and 0.5 at 30°C in tetrahydrafuran, said copolymer having the repeating unit of the formula

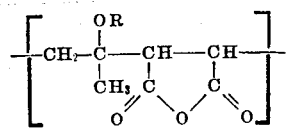

wherein R is an alkyl group having up to four carbon atoms, said process comprising polymerizing maleic anhydride and 2-alkoxy-propene in an organic solvent at a temperature between 0°C and 100°C in the presence of a radical catalyst.

2. The process according to claim 1 wherein the catalyst is α,α'-azo-bis-isobutyronitrile.

3. The process according to claim 1 wherein the organic solvent is dioxane.

4. The process according to claim 1 wherein the ratio of maleic anhydride to 2-alkoxypropene is between 1:1 and 1:2.

5. The process according to claim 3 wherein the organic solvent is acetone dimethyl ketal.

* * * * *